United States Patent

Shukunami

[11] Patent Number: 5,319,470
[45] Date of Patent: Jun. 7, 1994

[54] IMAGE FORMING APPARATUS FOR FORMING CHARACTER IMAGES IN ONLY A PREDETERMINED IMAGE FORMING AREA

[75] Inventor: Hiroshi Shukunami, Yokohama, Japan

[73] Assignee: Kabushiki Kaisha Toshiba, Kawasaki, Japan

[21] Appl. No.: 669,588

[22] Filed: Mar. 14, 1991

[30] Foreign Application Priority Data

Mar. 16, 1990 [JP] Japan .................... 2-64419

[51] Int. Cl.$^5$ ............................ H04N 1/387
[52] U.S. Cl. ...................... 358/451; 358/448
[58] Field of Search ............ 358/451, 452, 453, 296, 358/449, 498, 401, 448; 355/218, 311; 395/146, 147; H04N 1/387

[56] References Cited

U.S. PATENT DOCUMENTS

| | | | |
|---|---|---|---|
| 4,972,209 | 11/1990 | Tanigawa | 358/296 |
| 4,984,162 | 1/1991 | Torii et al. | 395/146 |
| 5,033,104 | 7/1991 | Amano | 358/261.1 |
| 5,040,078 | 8/1991 | Yahara | 358/449 |
| 5,130,805 | 7/1992 | Rikima | 358/406 |
| 5,144,452 | 9/1992 | Abuyama | 358/401 |
| 5,191,440 | 3/1993 | Levine | 358/452 |

*Primary Examiner*—Mark R. Powell
*Assistant Examiner*—Kim Yen Vu
*Attorney, Agent, or Firm*—Foley & Lardner

[57] ABSTRACT

The number of lines per page and the maximum number of characters per line defined by image data supplied from a host apparatus or the like are determined. On the basis of the number of lines per page and the maximum number of characters per line, it is determined whether image data will be formed in a non-printing area of a cut sheet of paper. If it is determined that the image data is formed in the non-printing area of the cut sheet of paper, the line and character pitches of the image data are changed into smaller pitches so that the image is printed in an printing area of the cut sheet of paper. The image data is printed in the printing area of the cut sheet of paper in accordance with the changed line and character pitches.

5 Claims, 13 Drawing Sheets

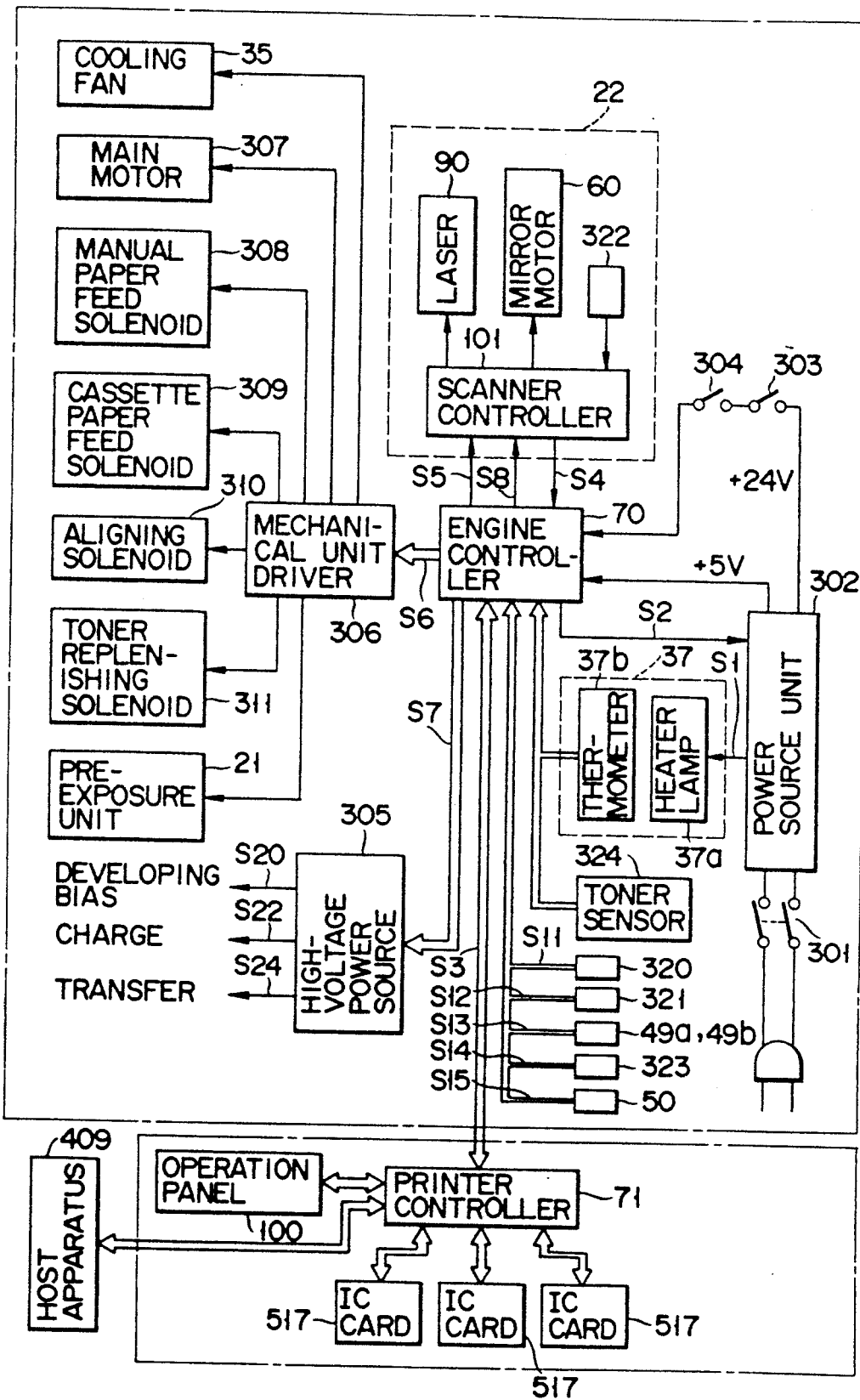
F I G. 3

A4 (210mm × 297mm)

| CHARACTER NUMBER | 63 OR LESS | 64 | 65 | 66 | 67 OR MORE |
|---|---|---|---|---|---|
| cpi | 8 | 8.06 | 8.19 | 8.31 | — |
| LINE NUMBER | 67 OR LESS | 68 | 69 | 70 | 71 OR MORE |
| lpi | 6 | 6.02 | 6.11 | 6.19 | — |

LG (11" × 14")

| CHARACTER NUMBER | 85 OR LESS | 86 | 87 | 88 | 89 OR MORE |
|---|---|---|---|---|---|
| cpi | 8 | 8.06 | 8.15 | 8.25 | — |
| LINE NUMBER | 81 OR LESS | 82 | 83 | 84 | 85 OR MORE |
| lpi | 6 | 6.03 | 6.10 | 6.18 | — |

LT (8.5" × 11")

| CHARACTER NUMBER | 65 OR LESS | 66 | 67 | 68 | 69 OR MORE |
|---|---|---|---|---|---|
| cpi | 8 | 8.08 | 8.20 | 8.32 | — |
| LINE NUMBER | 63 OR LESS | 64 | 65 | 66 | 67 OR MORE |
| lpi | 6 | 6.04 | 6.13 | 6.23 | — |

FIG. 9

IMAGE FORMING APPARATUS FOR FORMING CHARACTER IMAGES IN ONLY A PREDETERMINED IMAGE FORMING AREA

BACKGROUND OF THE INVENTION

1. Field of the Invention

The present invention relates to an image forming apparatus for receiving image data from an external apparatus and printing the received data on a cut sheet of paper.

2. Description of the Related Art

Since a dot-matrix printer prints an image on a continuous sheet of paper, the entire area of the sheet can be used as a printing area.

In a laser printer for performing printing on a cut sheet of paper, however, non-printing areas are provided on the leading and trailing ends and the right and left ends in consideration of possible skewing upon conveyance of a sheet or during fixing. For this reason, actual printing areas are different between the dot-matrix and laser printers even when the same form length is designated, i.e., an area of a cut sheet is smaller than that of a continuous sheet.

Conventional laser printers, however, recognize a designated form length (cut sheet length) as a printing area and prints printing data.

When an image is printed in conventional laser printers and the entire surface of a cut sheet is considered a printing area, therefore, some or all data in a non-printing area are lost, as shown in FIG. 12.

SUMMARY OF THE INVENTION

The present invention has been made in consideration of the above situation and has as its object to provide an image forming apparatus capable of forming an image of image data the image is formed by considering the entire surface of an image forming medium as an image formation area, on an image forming medium having a non-image formation area without losing the data.

It is another object of the present invention to provide an image forming apparatus capable of forming an image in an image formation area by changing a format even when a part of the image overlaps a non-image formation area.

In order to achieve the above objects of the present invention, there is provided an image forming apparatus comprising means for receiving character data and format data which defines a line pitch and a character pitch of the character data from a host apparatus, means for forming a character image corresponding to the character data in accordance with the line pitch and character pitch of the format data on a recording medium, the recording medium having an image formation area and a margin area located other than the image formation area, means for detecting the number of lines and the maximum number characters per line of the received character data, means for checking that the character image is formed on the margin area on the basis of the number of lines and the maximum number characters detected by the detecting means and a size of the recording medium, and means, in response to the checking means, for changing at least one of the line pitch and character pitch of the received character data so as to form the character image on only the image formation area.

The image forming apparatus according to the present invention changes a reference line pitch and/or a reference character pitch defined by image data or predetermined in the image forming apparatus so as not to form an image in a non-image formation area. Therefore, an image can be formed in an image formation area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show the first embodiment of the present invention, in which

FIG. 1 is a schematic view showing an internal structure of a laser printer,

FIG. 2 is a view showing printing and non-printing areas of a sheet,

FIG. 3 is a block diagram showing an arrangement of a main part of an engine control section, FIG. 4 is a block diagram showing an arrangement of an engine controller, FIG. 5 is a block diagram showing an arrangement of a main part of a printer control unit, FIG. 7 is a flow chart for explaining the operation of the engine control section, and FIG. 8 is a view showing an example of printing;

FIG. 9 is a view showing a format of a table used in the second embodiment of the present invention;

FIG. 12 is a view showing an example of conventional printing.

DETAILED DESCRIPTION OF THE PREFERRED EMBODIMENTS

A laser printer according to the first embodiment of the present invention will be described below with reference to FIGS. 1 to 8 and 12.

Figure 1:
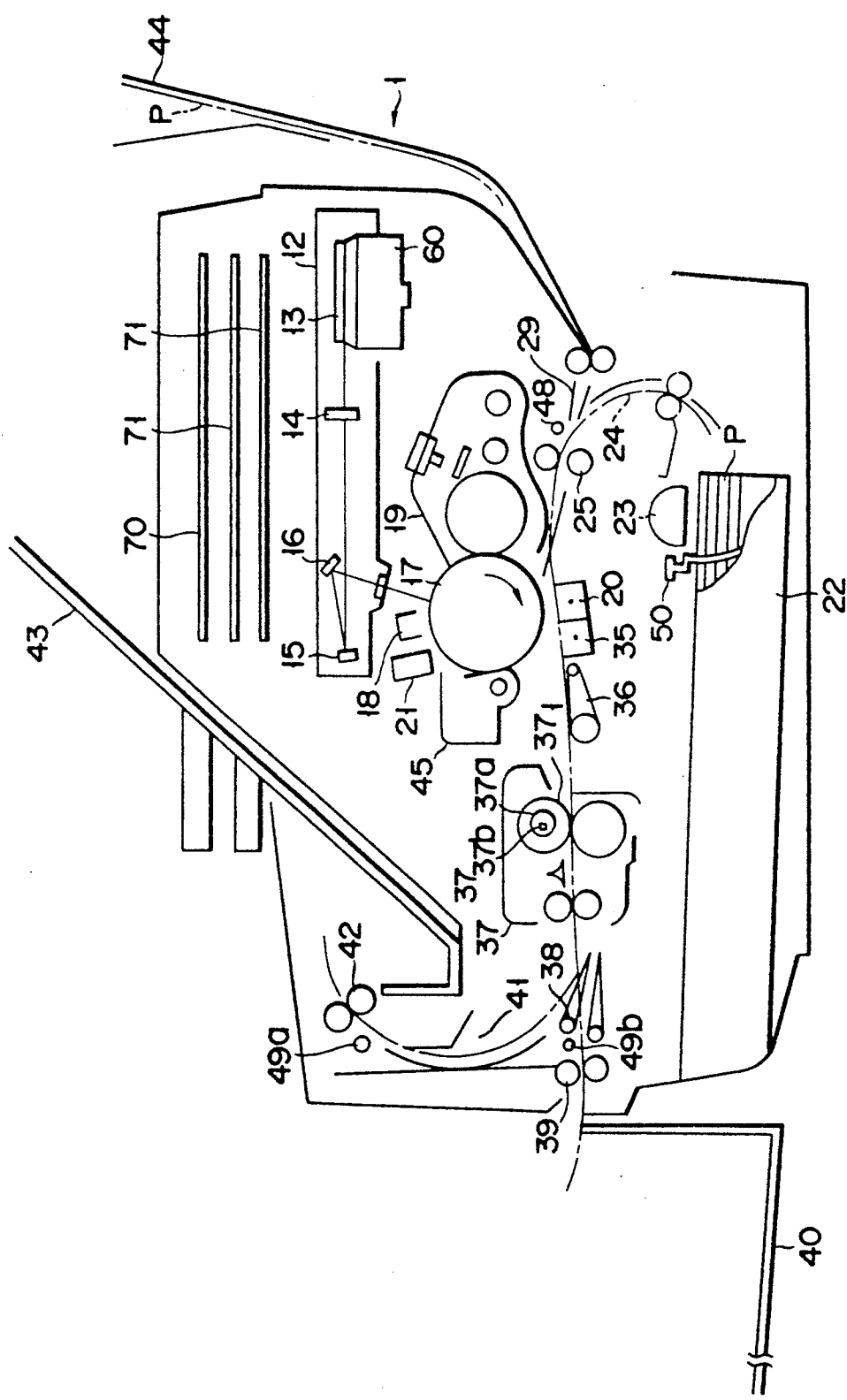

FIG. 1 shows an arrangement of the laser printer of this embodiment. A laser printer 1 incorporates a laser optical system 12 and a process system including, e.g., a photosensitive drum 17, a charging unit 18, a developing unit 19, a transfer unit 20, a pre-exposure unit 21, a separating unit 35, a fixing unit 37, and a cleaning unit 45. The laser printer 1 further includes a paper feed cassette 22, a paper feed roller 23, an aligning roller pair 25, a conveyor belt 36, a gate 38, and paper discharge roller pairs 39 and 42.

The laser optical system 12 is constituted by a semiconductor laser oscillator (not shown) for generating a laser beam, a collimator lens (not shown) for correcting the laser beam from the oscillator into a collimated beam, a polygon mirror 13 having an octahedral mirror for reflecting the laser beam from the lens, an f·θ lens 14, mirrors 15 and 16, and a mirror motor 60 for rotating the polygon mirror 13.

In an image formation operation, a laser beam corresponding to an image signal supplied from external equipment (not shown) is generated by the laser optical system 12 and imaged on the surface of the photosensitive drum 17. The drum 17 rotates in a direction indicated by an arrow in FIG. 1, and its surface is charged by the charging unit 18. Thereafter, exposure corresponding to the image signal is performed by the laser optical system 12. That is, the laser beam generated by the semiconductor laser oscillator is scanned at a constant rate in the left-to-right direction of the photosensitive drum 17 as the polygon mirror 13 is rotated by the mirror motor 60, thereby forming an electrostatic latent image on the surface of the drum 17. The developing unit 19 develops the electrostatic latent image by using a toner to form a toner image.

Figure 2:
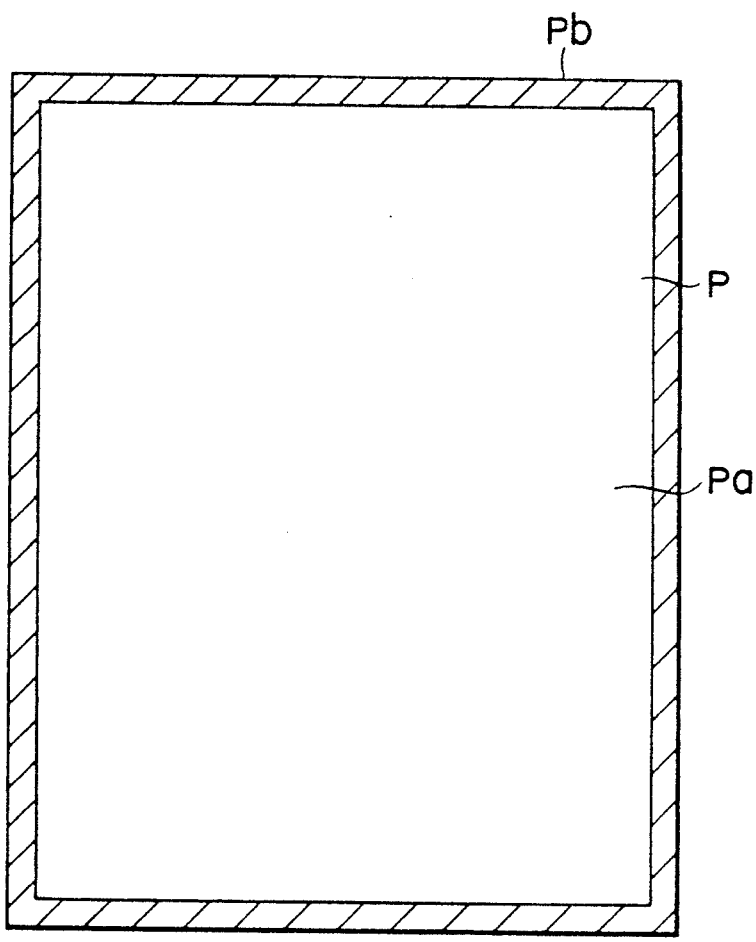

Sheets of paper P as an image recording medium in the paper feed cassette 22 are picked up one by one by the paper feed roller 23. The picked paper P is guided to the aligning roller pair 25 through a paper guide path 24 and conveyed to a transfer section. As shown in FIG. 2, the paper P is constituted by an image formation area, i.e., a printing area Pa provided in the central portion of the paper P to print image data and an margin area, i.e., a non-printing area Pb provided at the leading and trailing ends and the right and left ends of the paper P in consideration of skewing upon conveyance of the paper or during the fixing performance. If the paper P is a legal-size sheet having a sheet size of 11"×8.5", the width of the non-printing area Pb in each of the leading and trailing ends is 1/6", and that of the area Pb in each of the right and left ends is 1/5".

The paper P supplied to the transfer section is brought into tight contact with the surface of the photosensitive drum 17 by the transfer unit 20, and the toner image on the drum 17 is transferred. The imagetransferred paper P is separated from the drum 17 by the separating unit 35. The paper P is conveyed to the fixing unit 37 by the conveyor belt 36. The fixing unit 37 thermally fixes the transferred image on the paper P by a heat roller 37₁ for generating fixing heat. The heat roller 37₁ incorporates a heater lamp 37a for heating. The fixed paper P is conveyed onto a paper discharge tray 40 by the paper discharge roller pair 39 through a gate 38 or conveyed to an upper conveyor path 41 by the gate 38 and discharged onto a paper discharge tray 43 by the paper discharge roller pair 42.

Residual toner is removed from the photosensitive drum 17 after the transfer by a cleaning unit, and an after image on the drum is erased by the discharging unit 21, thereby setting the drum 17 in a state capable of performing the next image formation operation.

The fixing unit 37 is assembled as a unit and can be solely attached to/detached from the laser printer 1. In addition, an aligning switch 48 for detecting a paper feed error to the transfer section is provided before the aligning roller pair 25, and paper discharge switches 49a and 49b for detecting a paper feed error caused by the paper discharge roller pairs 39 and 42 are provided before the roller pairs 39 and 42, respectively.

A paper detector 50 for detecting the paper P is arranged in the paper feed cassette 22 to detect the presence/absence of the paper P in the cassette 22.

The laser printer further includes, in a portion above the optical laser system 12, an engine control circuit board having an engine controller 70 for controlling the respective electric units provided in the apparatus main body 1 to control an operation for completing an electrophotographic process and another circuit board having a printer controller 71 for controlling an operation of the engine controller 70.

A maximum of three circuit boards of the printer controller 71 can be mounted in accordance with additional functions (e.g., an increase in styles of types or kanji characters). In addition, additional functions can be further provided by inserting IC cards (not shown) for the additional functions into three IC card connectors 72 disposed on the front edge portion of the circuit board of the printer controller 71 located in the lowest stage. Furthermore, a connector (not shown) to be connected to a host apparatus 409 (to be described later) as an external apparatus such as an electronic computer or a wordprocessor is disposed on the left end face of the circuit board of the printer controller 71 in the lowest stage.

An arrangement of an engine control section will be described below.

FIG. 3 is a block diagram showing an arrangement of a main part of an engine control section 300. Referring to FIG. 3, power source unit 302 for outputs power source voltages of +5 V and +24 V when a main switch 301 is switched on. The +5-V power source voltage is supplied to the engine controller 70 and to the printer controller 71 via the engine controller 70. The +24-V power source voltage is supplied to the engine controller 70 via cover switches 303 and 304. The engine controller 70 supplies the +24-V power source voltage to a scanner controller 101, a high-voltage power source 305, and a mechanical unit driver 306. The +24-V power source voltage is supplied as a drive power source to a semiconductor laser 90 and a mirror motor 92 by the scanner controller 101 and to the preexposure unit 21, a main motor 307, a manual paper feed solenoid 308, a cassette paper feed solenoid 309, an aligning solenoid 310, a toner replenishing solenoid 311, a cooling fan 500, and the like by the mechanical unit driver 306.

The power source unit 302 incorporates a heater lamp driver (not shown), using a zero-cross switch constituted by, e.g., a phototriac coupler and a triac, for driving a heater lamp 501 in the fixing unit 33. The +24-V voltage is used as a drive power source for an LED on the light emission side of the phototriac coupler. In the heater lamp driver having this arrangement, when the light-emission-side LED is turned on/off, the phototriac on the light emission side is turned on/off at a zero-cross point of an AC power source to turn on/off the triac as a main switching element in the next stage, thereby supplying or stopping an AC power source S1 to the heater lamp 37a. A heater control signal S2 for turning on/off the light-emission-side LED is supplied from the engine controller 70 to the power source unit 302, and a temperature signal detected by a thermistor 37b provided in the fixing unit 37 is supplied to the engine controller 70.

A cover switch 303 is switched off when a top cover (not shown) is pivoted upward, and a cover switch 304 is switched off when a rear cover (not shown) is opened. When the top or rear cover is open, therefore, the switch 303 or 304 interrupts the +24-V voltage to stop operations of the semiconductor laser 90, the mirror motor 60, the high-voltage power source 305, the main motor 307, the solenoids 308 to 312, the cooling fan 500, and the heater lamp 37a, so that an operator is safe even if he or she touches the interior of the apparatus main body of the laser printer.

Figure 4:
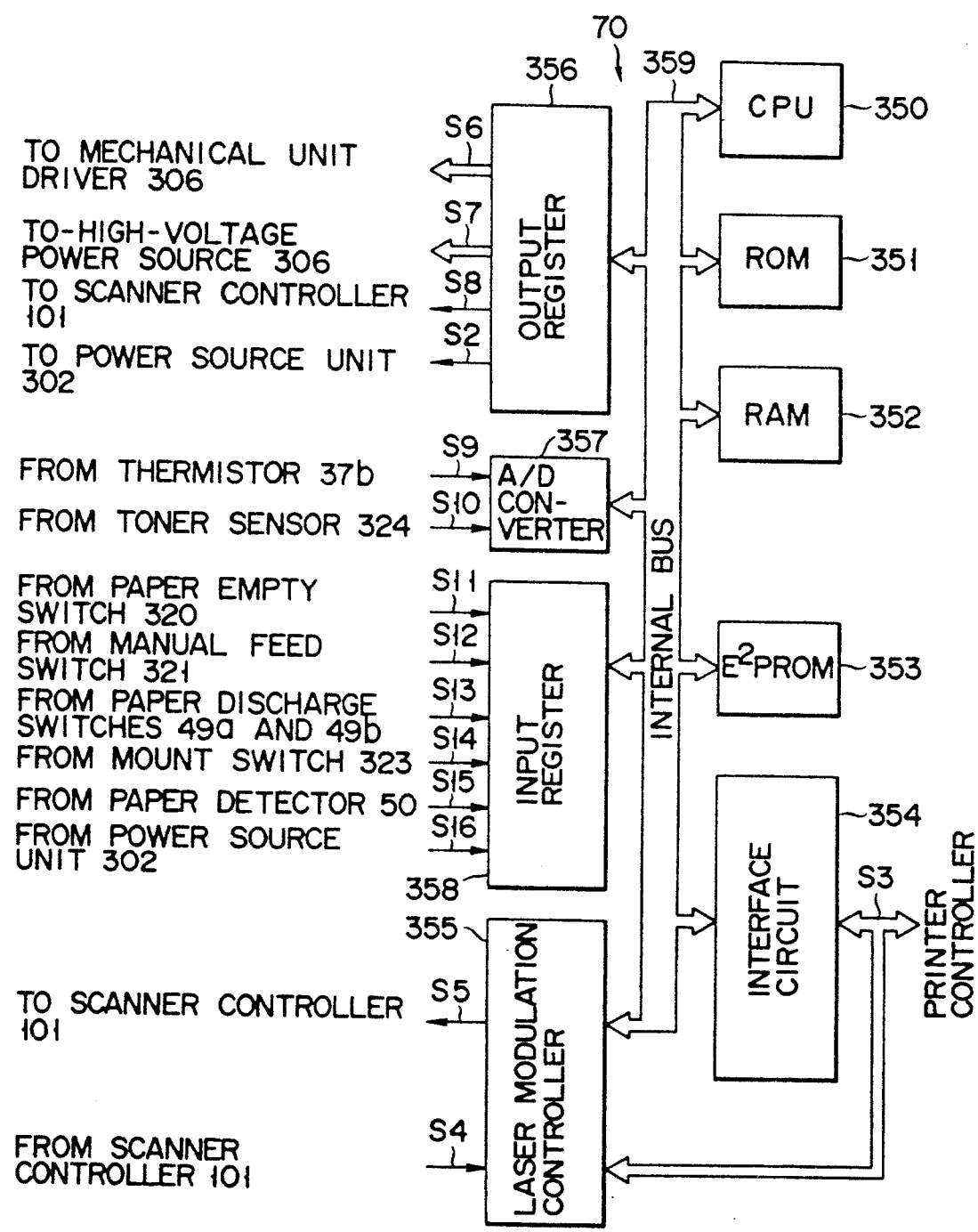

FIG. 4 is a block diagram showing an arrangement of the engine controller 70. Referring to FIG. 4, a CPU 350 controls the entire engine control section 300 and operates in accordance with control programs stored in a ROM 351. A RAM 352 is used as a work buffer of the CPU 350. An EEPROM 353 stores a total print number and the like. A printer interface circuit 354 intermediates exchange of an interface signal S3 between the printer controller 71 and the engine controller 70.

A laser modulation controller 355 periodically, forcibly turns on the semiconductor laser 90 in order to generate a laser beam detection signal S4 (to be described later) and modulation-controls the semiconductor laser 90 in accordance with image data supplied from the printer controller 71 by the interface signal S3. The laser modulation controller 355 outputs a laser modulation signal S5 to the scanner controller 101. An output register 356 outputs control signals S6, S7, S8, and S2 for controlling the mechanical unit driver 306, the high-voltage power source 305, the scanner controller 101, and the heater lamp driver, respectively.

An A/D converter 357 receives voltage signals S9 and S10 generated by the thermistor 37b and a toner sensor 324 and converts the voltage values of the signals into digital values. An input register 358 receives state signals S11, S12, S13, S14, and S15 from a paper empty switch 320, a manual feed switch 321, the paper discharge switches 49a and 49b, a mount switch 323, and a paper detector 50, respectively, and a state signal S16 indicating an ON/OFF state of the +24-V voltage.

An internal bus 359 is used in data exchange among the CPU 350, the ROM 351, the RAM 352, the EEPROM 353, the printer interface circuit 354, the laser modulation controller 355, the output register 356, the A/D converter 357, and the input register 358.

The mechanical unit driver 306 includes drive circuits for driving various types of motors, clutches, and solenoids and is ON/OFF-controlled by the binary control signal S6 output from the output register 356. That is, each drive circuit is turned on when the signal S6 is "1" and turned off when the signal S6 is "0" and supplies or stops the +24-V voltage to the pre-exposure unit 21, the main motor 307, the solenoids 308 to 312, and the cooling fan 500. The scanner controller 101 includes driver circuits for the semiconductor laser 90 and the mirror motor 60. The semiconductor laser 90 is ON/OFF-controlled by the laser modulation signal S5 output from the laser modulation controller 355, and the mirror motor 60 is ON/OFF-controlled by the control signal S8 output from the output register 356.

A laser beam sensor 322 is constituted by a PIN diode. When a laser beam passes through the sensor 322, a current proportional to an optical energy of the beam flows. This current signal is supplied as the laser beam detection signal S4 to the laser modulation controller 355. In addition, the high-voltage power source 305 outputs high-voltage signals such as a developing bias signal S20, a charge signal S22, and a transfer signal S24 to a developing bias supply unit (not shown), the charging unit 18, and a wire highvoltage supply unit (not shown) of the transfer unit 20, respectively. These signals are ON/OFF-controlled in accordance with the ON/OFF operation of the control signal S7 output from the output register 356.

As described above, in the engine control section 300, the power source is supplied to each electric circuit via the engine controller 70, and each unit is controlled in accordance with the binary control signal output from the engine controller 70. The engine control section 300 is coupled to a printer control section 400 (to be described below) by the interface signal S3.

An arrangement of the printer control section 400 will be described below.

Figure 5:
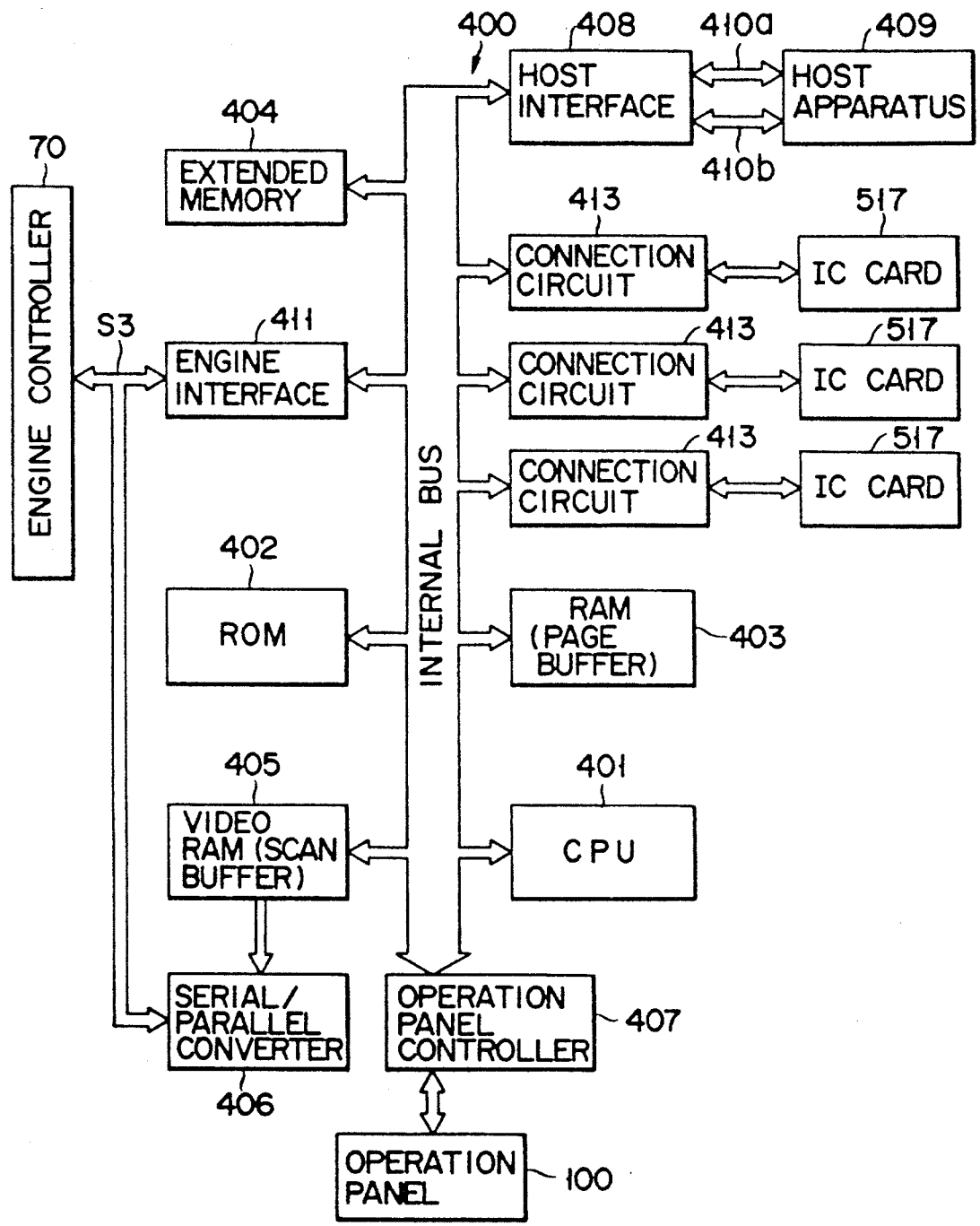

FIG. 5 is a block diagram showing an arrangement of a main part of the printer control section 400. Referring to FIG. 5, a CPU 401 controls the entire printer control section 400. A ROM 402 stores control programs, and the CPU 401 operates in accordance with the stored programs. The ROM 402 also stores data concerning the paper P such as a password which is collated upon data updating, a top margin, a left margin, and a paper type and message information to be informed to an operator. A RAM 403 is used as a page buffer for temporarily storing image data of a plurality of pages supplied from the host apparatus 409.

An extended memory 404 is a large-capacity memory used when image data supplied from the host apparatus 409 is a large amount of data such as bit map data and the RAM 403 cannot store data of one page. A video RAM 405 stores image data developed into a bit image and supplies an output to a serial-parallel converter 406. The serial-parallel converter 406 converts a parallel bit map image into serial data and supplies the data to the engine controller 70.

A host interface 408 includes two types of transfer lines, i.e., a serial transfer line 410a and a parallel transfer line 410b for performing data exchange between the host apparatus 409 constituted by a computer, a word-processor, an image reader, and the like and the printer control section 400. The two transfer lines 410a and 410b are arbitrarily, selectively used in accordance with the type of data transferred with respect to the host apparatus 409.

An engine interface 411 intermediates exchange of the interface signal S3 between the printer controller 71 and the engine controller 70. When an IC card 517 is connected to or disconnected from the connector 16, a connection circuit 413 interrupts a power source voltage supplied to the IC card 517, thereby preventing data stored in the IC card 517 from being destroyed by noise generated upon connection/disconnection of the card 517.

An operation panel controller 407 performs control for displaying a guide message on a liquid crystal display device (not shown) of an operation panel 100, control for turning on/off or flashing an LED display device (not shown), and control for supplying data input from a switch (not shown) to the CPU 401. An internal bus 412 is used in data exchange among the CPU 401, the ROM 402, the RAM 403, the extended memory 404, the video RAM 405, the operation panel controller 407, the host interface 408, the engine interface 411, and the connection circuit 413.

The IC card 517 is constituted by a nonvolatile memory such as a static RAM with a battery backup, an EEPROM, an EPROM, or a mask ROM and stores character fonts, emulation programs, and the like.

Figure 6A:
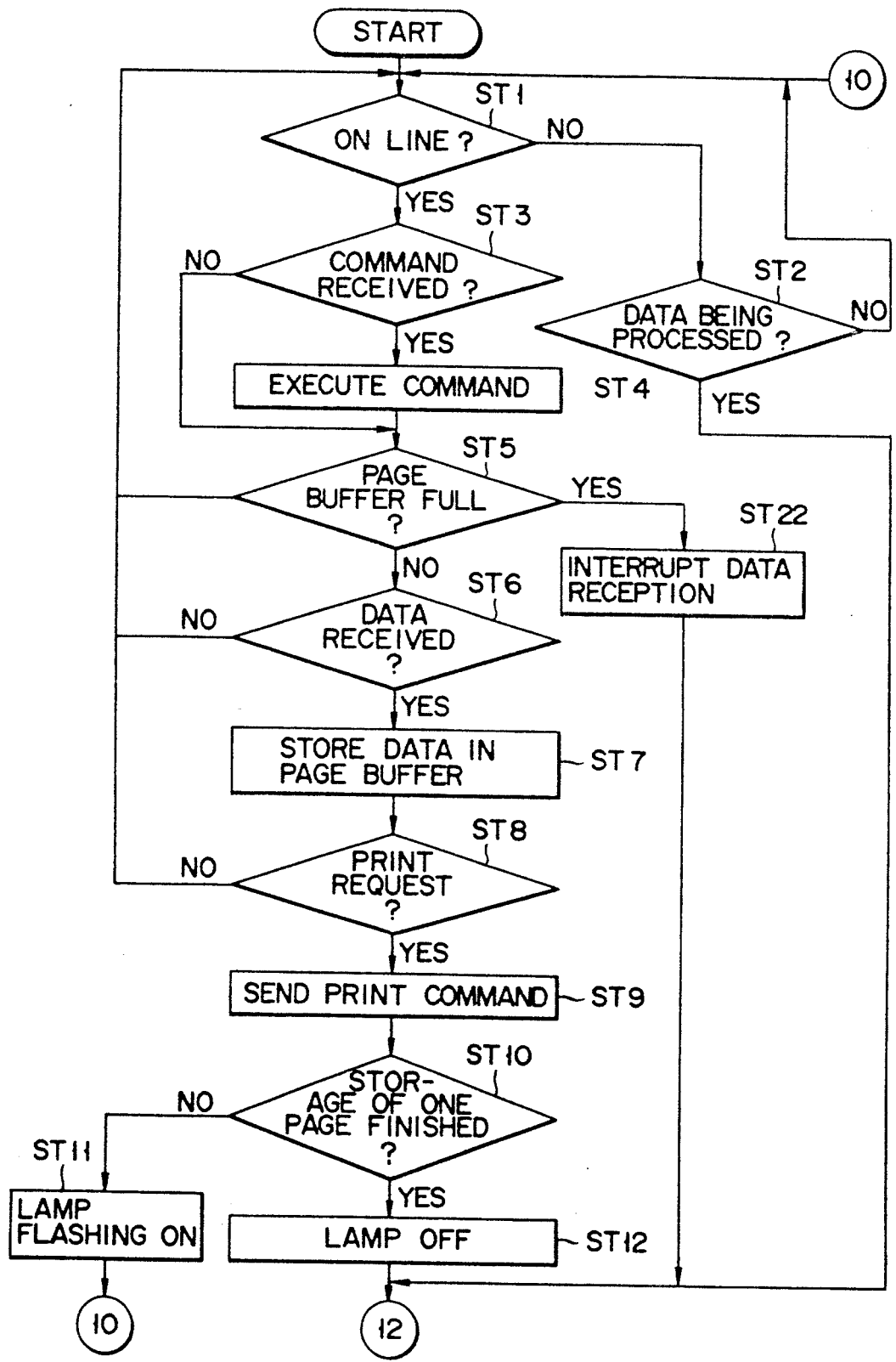
FIGS. 6A to 6C are flow charts for explaining the operation of a printer controller.
Figure 6B:
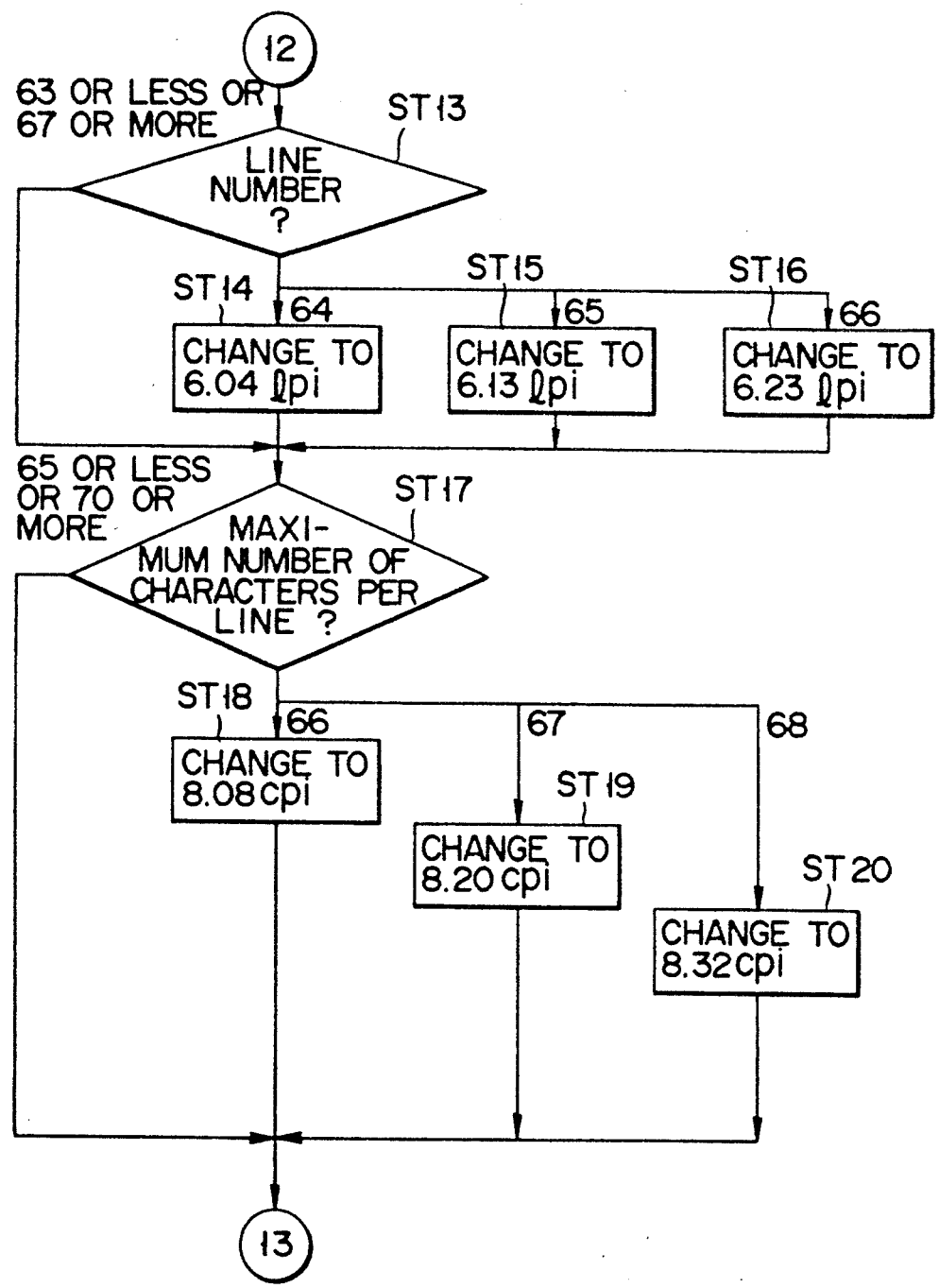
Figure 6C:
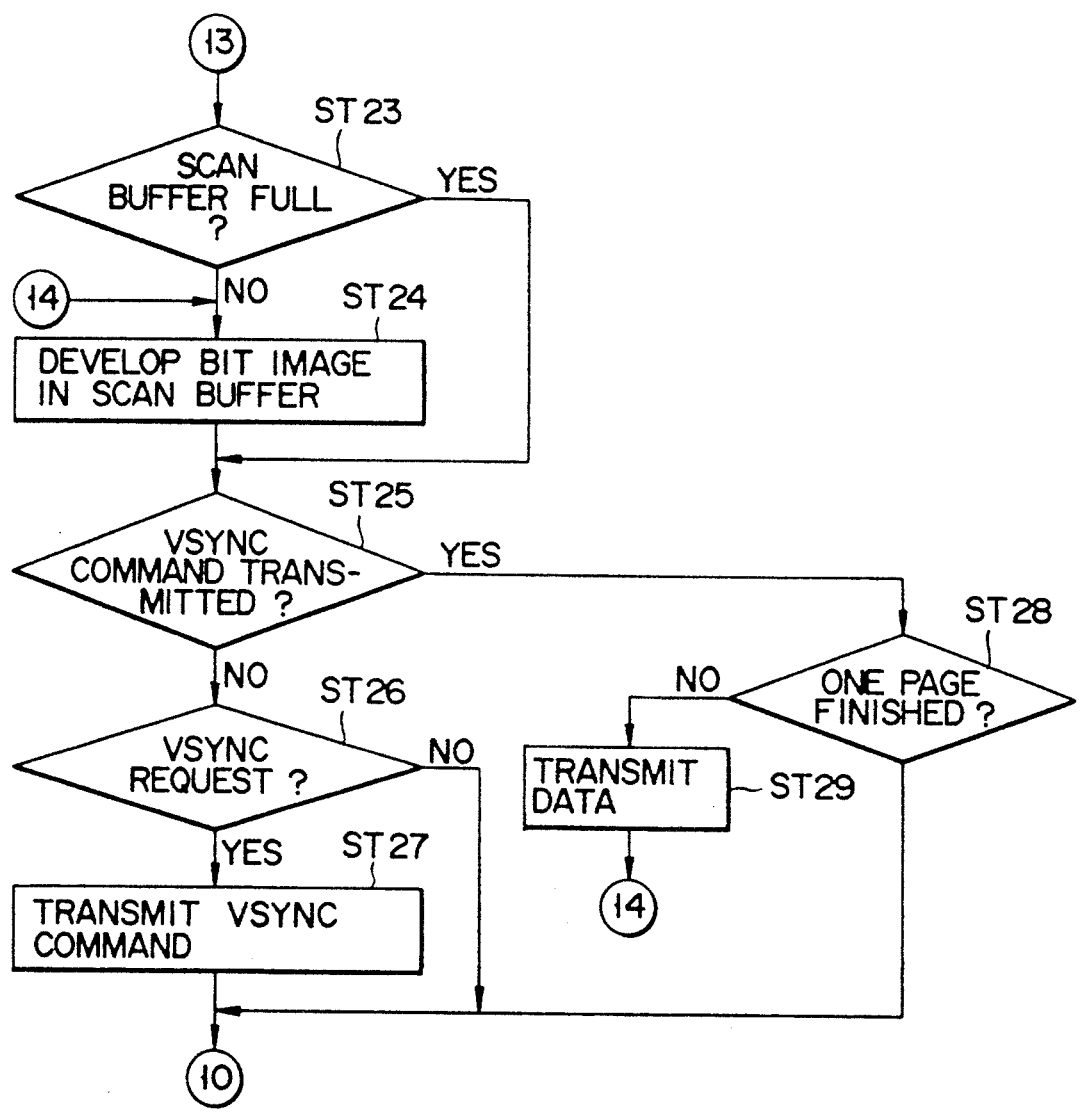

An operation of the printer controller 400 of the laser printer having the above arrangement will be described below with reference to flow charts shown in FIGS. 6A, 6B, and 6C.

Assume that the laser printer 1 is in an off-line state. When the CPU 401 determines the off-line state (step ST1), it checks whether processing for printing data previously received from the host apparatus 409 is completed (step ST2). If the CPU 401 determines in step ST2 that the print processing is not completed, the flow advances to step ST13 to continue the print processing. If the print processing is completed, steps ST1 and ST2 are repeatedly executed. As a result, an idling state is generated, and the system waits until the laser printer 1 is set in an on-line state.

When the laser printer 1 is set in the on-line state, this is detected in step ST1, and the flow advances to step ST3. In step ST3, the CPU 401 checks whether a command transmitted from the host apparatus 409 is received. If the CPU 401 determines in step ST3 that the command is received, the flow advances to step ST4 to perform an operation corresponding to the command. If the CPU 401 determines in step ST4 that no command is received, the flow jumps to step ST5. The command is used to define the attribute (e.g., the size of image data) of following data or perform printer control not accompanying data exchange. Thereafter, the CPU 401 checks whether a page buffer provided as a datareceiving buffer in the RAM 403 is full (step ST5). If the CPU 401 determines that the page buffer is not full, it checks whether image data supplied from the host apparatus 409 is received (step ST6).

If the CPU 401 determines in step ST6 that no image data is received, the flow returns to step ST1 to repeatedly execute a series of steps, and the system waits until the command or the image data is received.

If the CPU 401 determines in step ST6 that the image data is received, the received image data is sequentially stored in the page buffer (step ST7). Thereafter, the CPU 401 checks whether a print request is output (step ST8). In this case, no print request is output since print preparation of the engine control section 300 is not completed. If the CPU 401 determines that no print request is output, therefore, the flow returns to step ST1 to execute a series of steps again, and the system waits until a print request is output. If the CPU 401 determines in step ST8 that the print request is output, it transmits the print command to the engine control section 300 because the print preparation of the section 300 is completed (step ST9).

Subsequently, the CPU 401 checks whether storage of image data of one page in the page buffer provided in the RAM 403 is finished (step ST10). If the storage is not finished, the CPU 401 starts flashing a "data" lamp of the LED display device (not shown) provided in the operation panel 10 (step ST11). Thereafter, the flow returns to step ST1 to execute a series of steps, and the system waits until image data of one page is stored in the page buffer. If the CPU 401 determines that storage of the image data of one page is finished by repeatedly executing a series of steps, it turns off the "data" lamp (step ST12) and finishes the data receiving processing.

When the data receiving processing is finished, the CPU 401 checks the number of lines of the received data and a maximum number of characters per line of the data (steps ST13 and ST17). If the number of lines is 63 or less or 67 or more and the maximum number of characters is 65 or less or 69 or more, the CPU 401 determines a standard mode, i.e., a line pitch of 6.00 lpi (line/inch) and a character pitch of 8.00 cpi (character/inch), and the flow advances to print processing from step ST23. In this case, if the number of lines is 63 or less and the maximum number of characters is 65 or less, the CPU 401 determines that the image data can be printed in the print area Pa of the paper P shown in FIG. 2. If the number of lines is 69 or more, the CPU 401 determines that the data is to be divisionally printed on two pages.

Figures 8, 12:
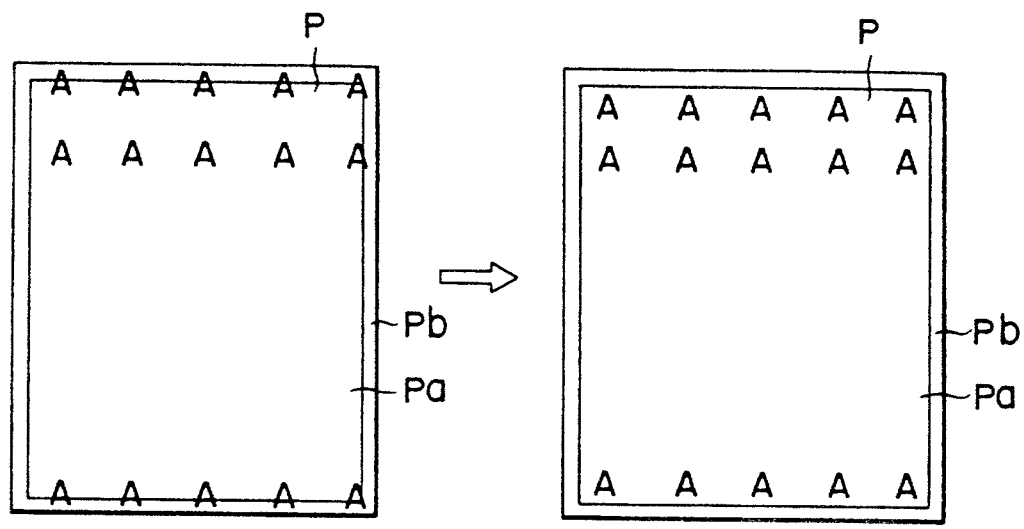

Assume that the number of lines is 64 to 66 and width of each non-printing area Pb in the leading and trailing ends of the paper P is 1/5 inch. In this case, if the image data is directly developed in a bit map pattern, the image data is developed in also the non-printing area in the leading and trailing ends of the paper P shown in FIG. 2 (see FIG. 12). Therefore, the CPU 401 determines that the line pitch is to be decreased so that the image data is developed in the print area Pa as shown in FIG. 8 without changing the number of lines and without dividing the data on two pages (step ST17). When the maximum number of characters is 66 to 68 and width of each non-printing area Pb in the right and left ends of the paper P is 1/6 inch, the image data is developed in also the non-printing area Pb in the right and left ends of the paper P shown in FIG. 2 if it is directly developed (see FIG. 12). Therefore, the CPU 401 determines that the character pitch is to be decreased so that the image data is developed in the printing area Pa as shown in FIG. 8 without changing the maximum number of characters (ST13).

More specifically, when the numbers of lines are 64, 65, and 66, the CPU 401 changes the line pitch from the reference value of 6.0 lpi (line/inch) to 6.04 lpi (ST14), 6.13 lpi (ST15), and 6.23 lpi (ST16), respectively.

Similarly, when the maximum numbers of characters are 66, 67, and 68, the CPU 401 changes the character pitch from the reference value of 8.0 cpi (character/inch) to 8.08 cpi (ST18), 8.20 cpi (ST19), and 8.32 cpi (ST20), respectively.

Thereafter, the flow advances to the print processing from step ST23.

Note that if the CPU 401 determines in step ST5 that the page buffer is full, it stops the data receiving operation (step ST22), and the flow advances to the print processing from step ST23. During the data receiving operation, the "data" lamp is flashed to inform an operator of the operation state.

Subsequently, the CPU 401 checks whether the scan buffer provided in the video RAM 405 is full (step ST23). If the CPU 401 determines that the scan buffer is not full, the flow advances to step ST24. In step ST24, the CPU 401 converts the image data stored in the page buffer into bit image data of a character image in accordance with the line and character pitches determined as described above and stores the converted data in the video RAM 405 as the scan buffer (step ST24). In a standard mode, for example, the CPU 401 develops the image data into a bit map image by the line pitch of 6.00 lpi and the character pitch of 8.00 cpi. If the number of lines is 66 and the maximum number of characters is 66, the CPU 401 develops the image data into a bit map image by the line pitch of 6.23 lpi and the character pitch of 8.08 cpi.

If the CPU 401 determines in step ST23 that the scan buffer is full, the flow jumps to step ST25.

Subsequently, the CPU 401 checks whether a VSYNC (vertical sync) command is transmitted (step ST25). If the CPU 401 determines that no VSYNC command is transmitted, it checks whether a VSYNC request is output from the engine section (step ST26). If the CPU 401 determines that no VSYNC request is output, the flow returns to step ST1 to repeatedly execute a series of steps, and the system waits until the VSYNC request is output. If the CPU 401 determines in step ST21 that the VSYNC request is output, the printer control section 400 transmits the VSYNC command to the engine control section (step ST27), and the flow returns to step ST1 to wait until a horizontal sync signal HSYNC0 and a video clock VCLK0 are input.

If the CPU 401 determines in step ST25 that the VSYNC command is already transmitted, it checks whether transfer of image data of one page from the scan buffer to the engine controller 70 is finished (step ST28). If the transfer of the image data from the scan buffer to the engine controller 70 is not finished, the CPU 401 transmits the image data of a bit image of 64 lines stored in the scan buffer to the engine side in synchronism with the horizontal sync signal HSYNC0 and the video clock VCLK0 (step ST29). Thereafter, the flow returns to step ST24 to repeatedly execute a series of steps, and the system waits until the transfer of image data of one page is finished. If the transmission of image data of one page is completed in this manner, the flow returns to step ST1. As a result, the printer controller 71 returns to the initial state capable of transferring image data of the next page.

Figure 7:
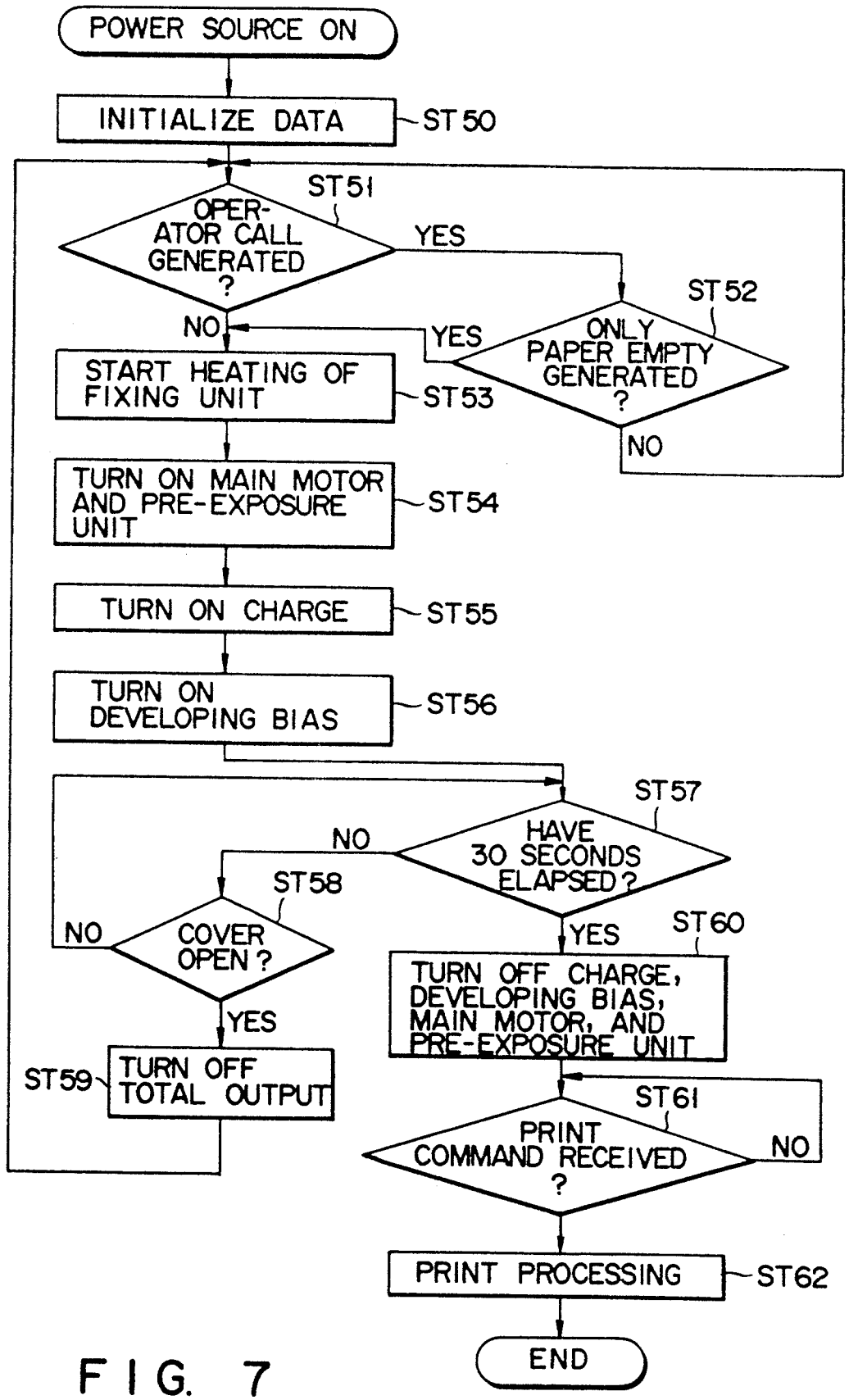

An operation of the engine control section 300 of the laser printer will be described below with reference to the flow chart shown in FIG. 7.

When the main switch 301 is switched on, a reset signal (not shown) is generated in synchronism with the leading edge of the +5-V power source to reset the engine controller 70. A reset signal SCLR1 is output to the printer controller 71 by the above reset signal to reset the controller 71. The level of the reset signal is inverted to release the reset state 200 to 500 msec after the +5-V power source rises. Thereafter, the CPU 350 starts execution of the programs stored in the ROM 351.

First, the data in the RAM 352 and the like are initialized (step ST50). Subsequently, the states of the respective switches are read in the input register 358, and the CPU 350 checks whether an operator call state such as paper jamming, a cover open state, a process unit unloaded state, or a paper empty state is generated (ST51). If the operator call is generated, the CPU 350 checks whether only the paper empty state signal is generated (step ST52). If an operator call except for the paper empty state signal is generated, the flow returns to step ST51, and the system waits until the operator call state is released.

If the CPU 350 determines in step ST52 that only the paper empty state signal is generated or determines in step ST51 that no operator call is generated, heating of the fixing unit 37 is started (step ST53). Subsequently, in order to initialize an electrophotographic process, the main motor 307 and the preexposure unit 21 are turned on (step ST54). The high-voltage power source 305 turns on the charge signal S22 (step ST55) and then turns on the developing bias signal S20 after a predetermined time interval determined by the program has elapsed from the ON timing of the charge signal S22 (step ST56). The CPU 350 checks whether a predetermined time period (=about 30 sec) has elapsed in this state (step ST57). Until the predetermined time period has elapsed, the CPU 350 checks whether the cover of the apparatus is opened (step ST58).

If the cover is opened, the CPU 350 turns off the signals turned on in steps ST53 to ST56 (step ST59), and the flow returns to step ST51. If the CPU 350 determines in step ST57 that the predetermined time period has elapsed, it turns off the charge signal S22, the developing bias signal S20, and the pre-exposure unit 21 (step ST60). By a series of operations in steps ST53 to ST60, a warming-up operation of the image forming apparatus is finished, and the apparatus is set in a ready state capable of performing a print operation.

The CPU 350 checks whether a print command is received (step ST61). If the CPU 350 determines that the print command is received, it resets a print request to execute a series of print operations (step ST62). In this case, if the number of lines is 64 to 66 or the maximum number of characters per line is 66 to 68, the CPU 350 decreases the line or character pitch as shown in steps ST14 to ST16 or steps ST1B to ST21. As a result, all of the image data is printed in the printing area Pa of the paper P except for the non-printing area Pb, i.e., no data are lost, as shown in FIG. 8.

As described above, in the printer of this embodiment, during printing performed by receiving image data from the host apparatus, if some of image data of one page overlap the non-printing area, the line and character pitches of the image data are decreased. Therefore, even when image data formed by considering the entire surface of a sheet as a printing area is to be printed on a cut sheet having a non-printing area, the data can be printed without losing any of it.

In the above first embodiment, assume that the size of paper and the character and line pitches are fixed and only the numbers of lines per page and characters per line can be designated by the host apparatus. The present invention, however, is not limited to the above embodiment.

For example, the present invention can be applied to a system in which a host apparatus can designate the size of paper, the character pitch, and the numbers of lines per page and characters per line. This second embodiment of the present invention will be described below with reference to FIGS. 9 and 10. The circuit arrangements of the second embodiment are the same as those shown in FIGS. 1, 3, 4, and 5. Note that a table shown in FIG. 9 is set in a ROM 402 shown in FIG. 3. As shown in FIG. 9, the number of lines, the line pitch (lpi), the maximum number of characters per line, and the character pitch (cpi) are set for each size of paper in this table.

Figure 10:
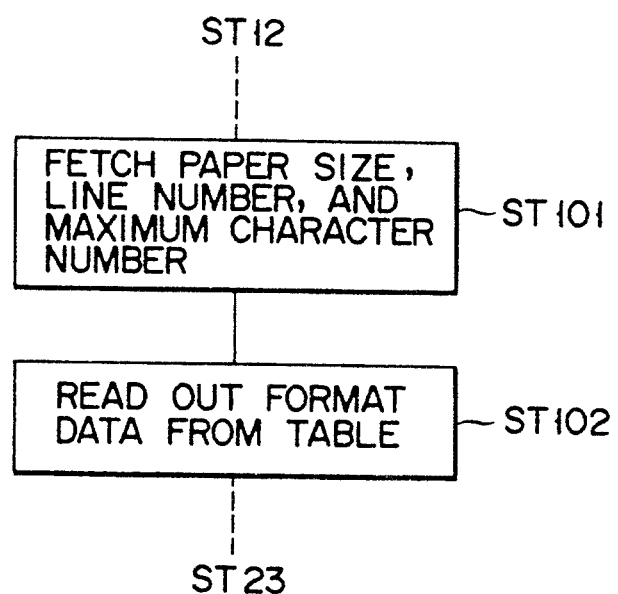
FIG. 10 is a flow chart for explaining the operation of the second embodiment of the present invention.

An operation of the second embodiment will be described below with reference to FIG. 10. After processing in step ST12 shown in FIG. 6B is finished, the paper size, the number of lines, and the maximum number of characters designated by a host apparatus are checked (ST101). Format data is read out from the table in accordance with the checked data (ST102). For example, if the host apparatus designates a legal size as the paper size, 82 as the number of lines per page, and 86 as the number of characters per line, a line pitch of 6.03 lpi and a character pitch of 8.06 cpi are determined in accordance with the table shown in FIG. 9. If the host apparatus designates A4 as the paper size, 68 as the number of lines per page, and 64 as the number of characters per line, a line pitch of 6.02 lpi and a character pitch of 8.06 cpi are determined in accordance with the table in FIG. 9. The format in LT (Letter) size shown in FIG. 9 corresponds to the example shown in FIG. 6B. Thereafter, the flow advances to step ST23 shown in FIG. 6C to execute print processing.

In this embodiment, a CPU 401 supplies the paper size designated by the host apparatus to an engine controller 70. A CPU 350 controls a mechanical unit driver 306 via an output register 356 to convey a sheet having the paper size designated by the host apparatus.

According to this embodiment, the present invention can be applied to an image forming apparatus to be connected to a host apparatus capable of designating different paper sizes.

In addition, the present invention can be applied to an image forming apparatus to be connected to a host apparatus capable of arbitrarily setting, e.g., the paper size, the character pitch, the line pitch, the number of lines per page, and the number of maximum characters per line. This third embodiment of the present invention will be described below with reference to FIG. 11. The circuit arrangements of this embodiment are the same as shown in FIGS. 1, 3, 4, and 5. Note that a ROM 402 shown in FIG. 3 stores the size (the printing area length and the printing area width) of a printing area for each paper size.

Figure 11:
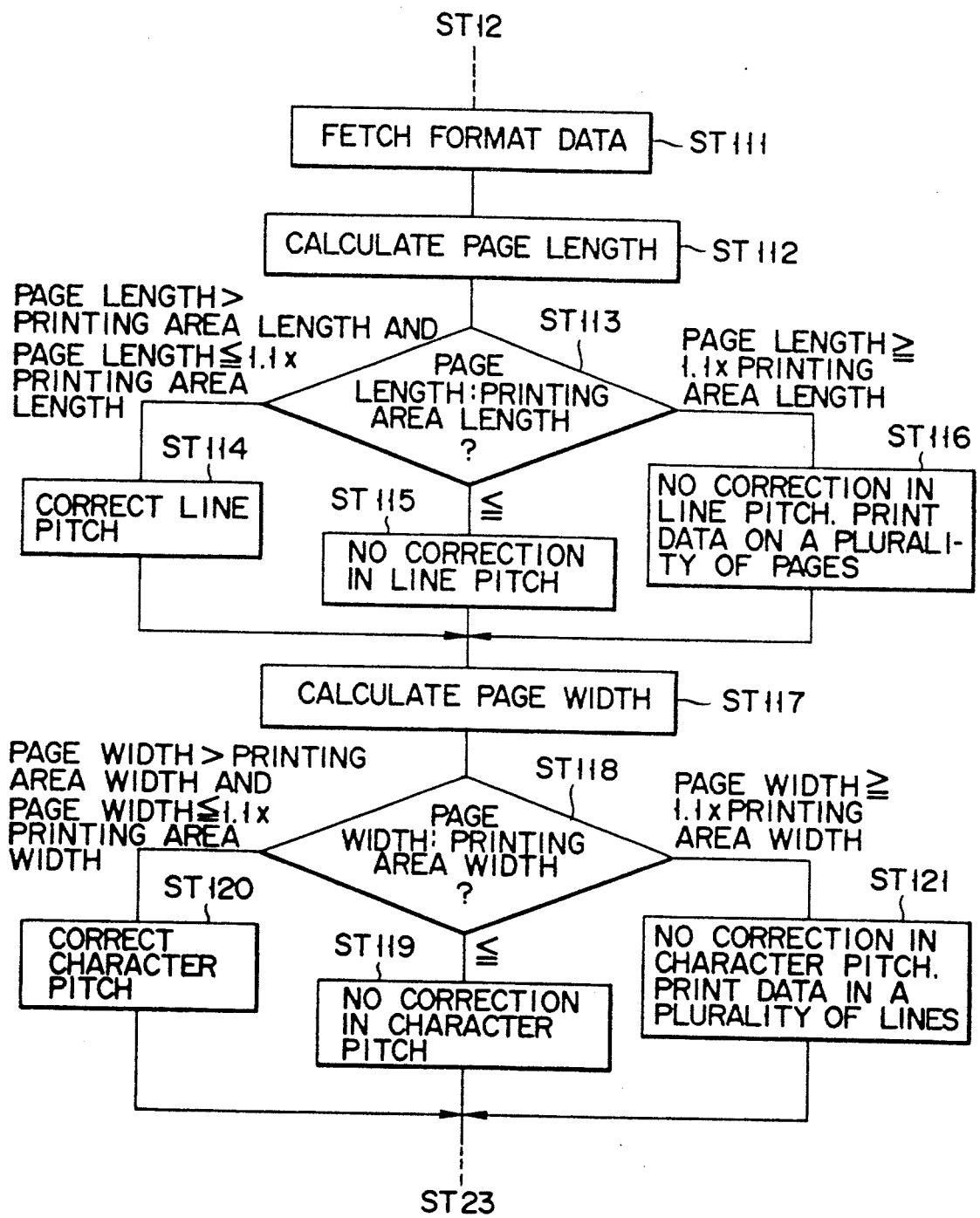
FIG. 11 is a flow chart for explaining the operation of the third embodiment of the present invention.

An operation of the third embodiment will be described below with reference to FIG. 11. For example, after processing in step ST12 shown in FIG. 6B is finished, format data (e.g., the paper size, the number of lines, the line pitch, the character size, the number of characters, and the character pitch) designated by a host apparatus is fetched (ST111). On the basis of the designated number of lines, line pitch, and character size, the size (length) in the longitudinal direction of a printing image per page is calculated (ST112). The size in the longitudinal direction of the printing image is calculated by line pitch × line number. The calculated image size is compared with the size of a printing area read out from a table (ST113). If the calculated image size is equal to or smaller than the printing area size, the line pitch designated by the host apparatus is directly used without any change (ST115). If the calculated image size is larger than the printing area size but smaller than, e.g., 1.1 times the printing area, the line pitch is changed by a calculation so that the image is printed in the printing area (ST114). The line pitch is calculated in accordance with, e.g., the following equation:

line pitch = [printing area length/line number]

where [] is the Gaussian symbol.

If the image size obtained by the calculation is, e.g., 1.1 times or more the printing area size, it is determined that the image is to be divisionally printed on two pages without changing the line pitch (ST116).

Subsequently, the size (page width) in the lateral direction of the designated image is calculated on the basis of the designated character pitch, character size, and maximum number of characters per line (ST117). The page width is calculated by character pitch × character number. Subsequently, the page width is compared with the printing area width read out from the table (ST118). If the page width obtained by the calculation is equal to or smaller than the printing area width, the character pitch designated by the host apparatus is directly used without any change (ST119). If the page width obtained by the calculation is larger than the printing area width but smaller than 1.1 times the printing area width, the character pitch is changed by a calculation so that the image is printed in the printing area (ST120). The character pitch is calculated in accordance with, e.g., the following equation:

character pitch = [printing area width/character number]

where [] is the Gaussian symbol.

If the page width obtained by the calculation is, e.g., 1.1 times or more the printing area width, it is determined that the image is to be printed by dividing each line into two lines without changing the character pitch (ST121) and if necessary, the image is to be divisionally printed on two pages without changing the line pitch.

Thereafter, the flow advances to step ST23 to execute print processing.

Also in this embodiment, a CPU 401 supplies the paper size designated by the host apparatus to an engine controller 70 and a CPU 350 controls a mechanical driver 306 via an output register 356 to convey a sheet having the paper size designated by the host apparatus.

According to the third embodiment, the present invention can be applied to an image forming apparatus to be connected to a host apparatus capable of arbitrarily designating, e.g., a paper size, a line pitch, a character pitch, a character size, the number of characters, and the number of lines.

In the above description, the page length and width and the line and character pitches after correction are obtained by the calculations. The present invention, however, is not limited to the above embodiment. For example, calculation results (the line and character pitches after correction) may be obtained beforehand for each combination of format data values and stored in a table or the like. In this case, printing is executed in accordance with the contents of the table. This method increases a printing rate. In addition, in the above embodiment, a value of 1.1 times the printing area size is used as a reference for checking whether the line and character pitches are to be corrected (ST113 and ST118). In the present invention, however, an arbitrary number except for 1.1, e.g., 1.2, can be used as the reference.

Furthermore, the present invention is not limited to the above embodiments but can be variously modified. For example, although a printing image is printed in a printing area by correcting line and character pitches in each of the above embodiments, a character size may be changed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus for forming a character image on a recording medium, said image forming apparatus comprising:

means for receiving character data and format data from a host apparatus, the character data defining the characters to be printed within one image forming unit of the recording medium and the format data defining a line pitch and a character pitch for the character data;

means for forming a character image corresponding to the character data in accordance with the line pitch and character pitch of the format data on the recording medium, the recording medium having an image formation area in which the character image is formed and a margin area located other than within the image formation area;

first detecting means for detecting the number of lines and the maximum number of characters per line of the received character data;

second detecting means for detecting a condition in which the character image is formed in the margin area when the character image is to be formed in accordance with the format data on the basis of the number of lines and the maximum number of characters detected by the first detecting means and the size of the recording medium; and means, in response to the second detecting means, for changing at least one of the line pitch or character pitch of the received format data so as to form the character image of the character data of one recording medium on only an area for one image forming unit within the image formation area of one recording medium.

2. An apparatus according to claim 1, wherein said changing means includes means for shortening at least one of the line pitch and the character pitch.

3. An image forming apparatus for forming a character image on a recording medium, said image forming apparatus comprising:

means for receiving character data to be printed within one image forming unit of the recording medium and format data which defines a line pitch and a character pitch of the character data from a host apparatus;

means for changing, when a character image defined by the character data and the format data is partially located in a margin area of the recording medium having an image formation area in which the character image is to be formed and the margin area, at least one of the line pitch and the character pitch, so that the character image is printed only within the image formation area of one recording medium;

means for forming the character image of the character data for one recording medium within the image formation area of the one recording medium in accordance with the changed line and character pitches; and detecting means for detecting a size of said recording medium;

wherein said changing means includes means for changing at least one of the line pitch and the character pitch so that the character image is printed only in the image formation area of said recording medium on the basis of the number of lines, the maximum number of characters designated each line and the size of said recording medium.

4. An image forming apparatus for forming a character image on a recording medium, said image forming apparatus comprising:

means for receiving character data to be printed within one image forming unit of the recording medium and format data which defines a line pitch and a character pitch of the character data from a host apparatus;

means for changing, when a character image defined by the character data and a format data is partially located in a margin area of the recording medium having an image formation area in which the character image is to be formed and the margin area, at least one of the line pitch and the character pitch, so that the character image is printed only within the image formation area of one recording medium; and means for forming the character image of the character data for one recording medium within the image formation area of the one recording medium in accordance with the changed line and character pitches;

wherein said changing means includes:

first table means for storing data indicating a relationship between the maximum number of characters per line and the character pitch and a relationship between the number of lines and the line pitch, and means for changing the line pitch and the character pitch in accordance with the stored data in said first table means.

5. An image forming apparatus for forming a character image on a recording medium, said image forming apparatus comprising:

means for receiving character data to be printed within one image forming unit of the recording medium and format data which defines a line pitch and a character pitch of the character data from a host apparatus;

means for changing, when a character image defined by the character data and a format data is partially located in a margin area of the recording medium having an image formation area in which the character image is to be formed and the margin area, at least one of the line pitch and the character pitch so that the character image is printed only within the image formation area of one recording medium; and means for forming the character image of the character data for one recording medium within the image formation area of the one recording medium in accordance with the changed line and character pitches;

wherein said changing means includes:

means for calculating an image size of the character image obtained when data to be printed is developed, means for comparing the image size with a size of the image formation area of said recording medium, and means for changing the line and character pitch on the basis of the comparison result from the comparing means.

* * * * *